United States Patent [19]

Holland

[11] Patent Number: 4,746,830

[45] Date of Patent: May 24, 1988

[54] ELECTRONIC SURVEILLANCE AND IDENTIFICATION

[76] Inventor: William R. Holland, 1237 Weathervane La., Apt. 3-C, Akron, Ohio 44313

[21] Appl. No.: 839,418

[22] Filed: Mar. 14, 1986

[51] Int. Cl.[4] ............................................. H01L 41/08
[52] U.S. Cl. ............................ 310/313 D; 310/313 R; 333/153; 333/195
[58] Field of Search ........... 310/313 R, 313 A, 313 B, 310/313 C, 313 D; 333/153, 195

[56] References Cited

U.S. PATENT DOCUMENTS

| | | | |
|---|---|---|---|
| 3,273,146 | 9/1966 | Hurtwitz | 343/6.8 |
| 3,289,114 | 11/1966 | Rowen | 333/30 |
| 3,376,572 | 4/1968 | Mayo | 343/17.2 |
| 3,551,837 | 8/1969 | Speiser et al. | 333/30 |
| 3,568,104 | 3/1971 | Bailey | 333/30 |
| 3,568,120 | 3/1971 | Tseng | 333/30 |
| 3,706,094 | 12/1972 | Cole et al. | 343/6.5 SS |
| 3,831,044 | 8/1974 | Speiser | 310/313 D |
| 3,883,831 | 5/1975 | Williamson et al. | 310/313 D |
| 3,931,597 | 1/1976 | Cho et al. | 330/30 |
| 3,938,125 | 2/1976 | Benassi | 340/280 |
| 3,944,928 | 3/1976 | Augenblick et al. | 325/65 |
| 3,961,290 | 6/1976 | Moore | 333/30 |
| 4,028,648 | 6/1977 | Hartmann et al. | 333/72 |
| 4,063,229 | 12/1977 | Welsh et al. | 340/280 |
| 4,096,477 | 6/1978 | Epstein et al. | 343/6.5 SS |
| 4,146,852 | 3/1979 | Godfrey et al. | 333/195 |
| 4,268,808 | 5/1981 | Melngailis | 333/195 |
| 4,336,514 | 6/1982 | Paige | 333/195 |
| 4,364,043 | 12/1982 | Cole et al. | 340/825.54 |
| 4,399,441 | 8/1983 | Vaughan et al. | 343/6.5 SS |
| 4,409,570 | 10/1983 | Tanski | 310/313 A |
| 4,453,242 | 6/1984 | Toda | 369/132 |
| 4,463,353 | 7/1984 | Kuzara | 340/825.54 |
| 4,471,345 | 9/1984 | Barrett | 340/572 |
| 4,484,098 | 11/1984 | Cullen et al. | 310/313 |
| 4,498,010 | 2/1985 | Biechler et al. | 250/492.2 |
| 4,510,490 | 4/1985 | Anderson et al. | 340/572 |
| 4,521,711 | 6/1985 | Okamoto et al. | 310/313 B |
| 4,625,208 | 11/1986 | Skeie et al. | 333/195 X |

OTHER PUBLICATIONS

Williamson et al., "Reflective-Array Matched Filter for a 16-Pulse Radar Burst," pp. 400-404, 1975 *Ultrasonics Symposium Proceedings*, IEEE Cat. #75 CHO 994-4SU.

Gopani, et al., "Integrated Phasing and Matching Networks in Printed Form for a Three-Phase Unidirectional Transducer", pp. 41-46, 1983 *Ultrasonics Symposium*, IEEE No. 90-5607/83.

Yamanouchi, et al., "Low-Loss Unidirectional Saw Filters Using Integrated Micro-Inductors" pp. 47-52, 1983 *Ultrasoncis Symposium*, IEEE No. 90-5607/83.

Cross, et al., "Microwave SAW Resonators Fabricated with Direct-Writing, Electron-Beam Lithography," pp. 158-163, 1980 *Ultrasonics Symposium*, IEEE No. 90-5607/80.

Bjorkholm, et al., "Monitoring the Growth Nonuniform Gratings Written Holograpically by Gaussian Laser Beams," pp. 2402-2405, *J. Appl. Phys.* 57 (7), Apr. 1, 1985.

Martin, et al., "Surface Acoustic Wave Resonators on ZnO-on-Si Layered Medium,38 54 (2), Feb. 1983, pp. 561-569.

*Primary Examiner*—Mark O. Budd

[57] ABSTRACT

An electronic article surveillance and identification system employing a transceiver (10,11) for broadcasting an interrogation signal into a zone to track the location and movement therein of inventory, merchandise, vehicles, animals, people and objects carrying passive (unpowered) transponder tags (12) adapted to receive the interrogation signal, process the signal in an encoded surface acoustic wave device (15) having a predetermined pattern of reflection groove or grating transducers (30-39, 40-72) and echo an encoded response signal to the transceiver.

11 Claims, 1 Drawing Sheet

ELECTRONIC SURVEILLANCE AND IDENTIFICATION

TECHNICAL FIELD

The present invention relates generally to electronic surveillance and identification systems for tracking location and movement of articles, vehicles, animals, persons and objects by employing coordinated transmitters and receivers ("transceivers") broadcasting radio frequency ("RF") waves into a remote security, automation control, inventory or traffic zone to detect or monitor the presence and predetermined encoded identity of passive (unpowered) transponders attached to or embedded in such objects. More particularly, the present invention relates to improved construction, components, fabrication and assembly of such transponders for such surveillance and identification systems. More specifically, the invention relates to such a transponder which contemplates ultrasonic processing of, and retransmitting an encoded echo or response to, electromagnetic RF waves from such transceivers by utilizing a surface acoustic wave ("SAW") device or microelectronics chips ("SAW Chip") with defect-tolerant phase and/or amplitude encoded reflection grooves or gratings to facilitate ease of fabrication and assembly and to minimize the cost and optimize the performance of such SAW Chips in such transponders.

BACKGROUND ART

The electronic article surveillance ("EAS") industry has been evolving for several decades in attempts to deter and detect pilferage and shoplifting in libraries, stores and retail establishments. All such EAS systems employ portal control using exit RF transceivers or else magnetometer scanners at store exits to detect the presence, and thereby unauthorized removal, of passive RF transponder or electrically magnetized or magnetizable ("EM") tags, labels or markers attached to merchandise, items or articles under surveillance. These EAS systems generally operate upon principles of sensing RF or magnetic field disturbance in the portal or exit surveillance zone created by the transceiver or magnetometer scanners.

For an example of an EAS system using a passive diode in an RF transponder tag, reference may be made to U.S. Pat. No. 4,063,229, granted to Welsh and Vaughan and assigned to Sensormatic Electronics Corporation; and, for an EM tag EAS system, to U.S. Pat. No. 3,938,125, granted to Benassi and assigned to Minnesota Mining and Manufacturing Company.

Such EAS systems have been efficacious as evidenced by the worldwide proliferation of the ubiquitous white plastic tags attached to garments and merchandise in retail stores with pedestal scanners at exits. However, such EAS systems have inherent performance limitations and deficiencies due to governmental regulatory, economic and fundamental physical constraints on the field strength and detection sensitivity of the transceiver or magnetometer scanners and the innate inefficiencies of energy conversion, modulation or field disturbance of the passive elements such as diodes in the EAS transponder tag. Hence, the EAS systems have been inordinately susceptible to false triggering and alarms, detuning of tags by close proximity to metal or coins and shielding the attenuation of tag response by moisture or the human body. Moreover, such EAS tags are unresponsive, having only one binary bit ("0" or "1" or "Yes" or "No") of memory, and are thus known in the industry as "dumb" tags; and, from the inception of EAS, the quest has proceeded for a remotely interrogatable "intelligent" tag having multiple binary bits or codes to discriminate among tags under surveillance and automate inventory control.

Most such attempts to encode EAS tags have involved elaborate schemes with multiple discrete ("MD") or expensive integrated circuit microchip ("IC") transponder devices to receive and retransmit the interrogation or surveillance zone field broadcast by the scanner, usually by frequency modulation ("FM") of harmonic or subharmonic responses from the transponder tag. However, the attempts encountered concomitant excessive cost of fabrication and assembly of the MD and IC components, weak signal responses from energy losses in such frequency conversion and modulation with consequent limited interrogation range and tag misreading or nonresponse due to misorientation in the scanner interrogation field, limited code capacity and unwieldy size for operation at the permissible transceiver operating frequencies allocated by governmental regulatory agencies, as well as the residual EAS tag deficiencies and limitations of false triggering from environmental metal and diode-emulating objects, detuning and moisture or body shielding. In many instances, batteries must be added onboard the FM tags to meet minimal performance criteria, thereby further increasing cost and detracting from reliability and feasible applications due to unpredictable operating life and environmental fragility of such batteries in hostile ambient temperature and moisture conditions.

For disclosures of typical encoded EAS transponder tag system designs, reference may be had, for example, to U.S. Pat. Nos. 3,944,928, granted to Augenblick and Keller and assigned to Microlab/FXR (harmonic communication); 4,364,043, granted to Cole, Eshraghian and Roy and assigned to the The University of Adelaide (near-field subharmonic); 4,463,353, granted to Kuzara and assigned to Ralston Purina Company (animal identification by oscillator field disturbance); 4,471,345, granted to Barrett and assigned to Sensormatic Electronics Corporation (coded portal interrogation); and 4,510,490, granted to Anderson, Kearney and Bretts and assigned to Allied Signal Corporation (mechanically resonating magnetic marker or EM tag).

Meanwhile, other approaches to remote electronic object identification were explored, principally for vehicles such as railway cars, using sonic delay lines or bulk acoustic wave ("BAW") piezoelectric resonators or reverberators as passive apparatus for field disturbance response to roadside oscillators. Owing to the unweildy size, excessive expense, short range, slow processing speed and limited code capacity of such BAW devices, they have not secured widespread adoption for automatic identification ("AI") and have not been employed to any significant degree in EAS applications. Examples of designs of such BAW devices may be found in U.S. Pat. Nos. 3,568,104 and 3,273,146, granted, respectively, to Bailey and Hurwitz and assigned to General Electric Company.

As in the case with encoded FM transponder tags, the BAW device designers approached the problems of remote electronic interrogation by focusing upon the frequency domain of the response.

In the meantime, in somewhat unrelated developments over the past several decades, passive microelectronics filter and delay line components, albeit hardwired for powered circuitry, having been evolving following the rediscovery and adaptation by John H. Rowen of Bell Telephone Laboratories of surface acoustic wave ("SAW") piezoelectric phenomena first discovered over a century ago by Lord Rayleigh. For disclosure of such a selectively tapped SAW delay line in active, as opposed to passive, circuits reference may be had to Rowen's U.S. Pat. No. 3,289,114, assigned to Bell Telephone Laboratories. Such active SAW devices or SAW Chips typically utilize a piezoelectric substrate onto which a pattern of interleaved or interdigitated electrodes or transducers are deposited or adhered for transduction of electromagnetic energy into ultrasonic SAW energy, and vice versa, thereby affording signal delay in the time, as opposed to frequency, domain.

Shortly after Rowen's discovery, encoded active SAW device design publications emerged for shaping and encoding signal responses by predetermined variance of spacing and arrangement of the electrodes or interdigital transducers "IDT'S"), thereby altering response signal phase and amplitude. For examples of such encoded active SAW devices, reference may be had to the disclosures of U.S. Pat. Nos. 3,376,572, granted to Mayo and assigned to RCA, and 3,551,837, granted to Speiser and Whitehouse and assigned to the U.S. Navy. At about the same time, disclosures were published for substituting reflection gratings or grooves, although unencoded, for IDT patterns, as exemplified by U.S. Pat. No. 3,568,102, granted to Tseng and assigned to Litton, and an article by Williamson, Melngailis and Dolat of Massachusetts Institute of Technology, entitled "Reflective-Array Matched Filter For a 16-Pulse Radar Burst" and published in 1975 *Ultrasonics Symposium Proceedings,* IEEE Cat. No. 75 CHO 994-4SU. While the aforesaid Williamson, et al., reference does describe varying reflection groove depths to impart response signal weighting in an active SAW device, neither it nor any other groove or grating SAW device disclosure of which applicant is aware discloses or suggests binary encoded passive reflective grating or groove SAW Chip transponder devices.

Indeed, early and continued approaches to the present time to incorporate SAW devices into "intelligent" or encoded passive transponder tags for EAS and AI uses steadfastly focus upon varying the spaces between electrode transducers or IDT's. For examples of such designs, reference may be had to U.S. Pat. Nos. 3,706,094, granted to Cole and Vaughan of Australia ("Cole-Vaughan I"), and 3,961,290, granted to Moore and assigned to Texas Instruments Incorporated.

However, apart from the added fabrication costs of laser trimming such IDT's to preselect a code, such SAW Chips with encoded IDT's, at the permissible operating frequencies allocated by regulatory authorities and dictated by size constraints for convenient EAS and AI uses, must have circuit dimensions or line widths under one micron (one millionth of a meter); and such submicron IDT tolerances, being at or beyond the state of the art for mass production of microchip devices, render such SAW Chips with encoded IDT's defect-prone at best. Such limitations have been recognized by parties skilled in the art, whose proposals for alleviating the problem have, however, involved manual field programming of codes onto necessarily inordinately long SAW Chips for sufficient binary bits for EAS or AI use, all as disclosed in U.S. Pat. No. 4,096,477, granted to Epstein and Jordan and assigned to Northwestern University. Nevertheless, as disclosed, for example, in U.S. Pat. No. 4,399,441, granted to Cole and Vaughan and assigned to Unisearch Limited of Australia ("Cole-Vaughan II"), the persistent preference of prior proposers of encoded SAW Chips for passive EAS and AI transponder tags has been for defect-prone IDT's, with defect-tolerant grooves or gratings being relegated to unencodeable, unireaponsive or "dumb" tag resonator transponders for simple or ordinary EAS use. (Comparison is invited of FIG.'S 10 and 11 of Cole-Vaughan I with FIG.'S 9 and 10 of Cole-Vaughan II.)

Hence, production problems persist in the prior art. Moreoever, use of multiple IDT's for encoding diminishes the energy conversion efficiency of a SAW Chip in repeated acoustic to electric effects, thereby decreasing the SAW transponder tag range and detectable binary code capacity.

DISCLOSURE OF THE INVENTION

Therefore, an object of the present invention is to provide a SAW Chip having encoded reflection grooves or gratings for embodiment in a passive transponder tag, label or pellet implant and use in an EAS and/or AI ("EASI") system. Another object of the invention is to provide such a SAW Chip to alleviate or obviate cost, volume production and performance problems associated with IDT's in such EASI systems. A further object of the invention is to provide such a SAW Chip for such an EASI system having reflective groove or grating arrays, unidirectional launching IDT's and associated or integrated inductors or circulators in an EASI transponder tag furnishing discrete binary bit response signals or echoes to an interrogation signal from a transceiver scanner, without significant response signal interference or smearing and with improved range and code capacity.

Yet another object of the invention is to provide such a SAW Chip having a piezoelectric substrate and cover or package assembly which is less expensive in terms of material and fabrication costs than devices employing IDT's. A still further object of the invention is to provide a method or process for fabricating and assembling such encoded SAW Chips with reflection grooves or gratings, using conventional, rather than expensive state of the art, equipment and facilities.

In general, an encoded surface acoustic wave ("SAW") microelectronics chip ("SAW Chip") for embedding in a passive (unpowered) radio frequency ("RF") transponder tag for electronic article surveillance and identification ("EASI") in an RF field control zone broadcast by a transceiver scanner, according to the concepts of the present invention, includes an anisotropic piezoelectric substrate; an interleaved electrode or interdigitated transducer ("IDT") pattern, deposited or adhered to a surface of the substrate and having at least a single electrical port or contact pad pair adapted for connection to a wire, foil or conductive film antenna in the RF transponder tag for propagating or launching SAW perturbations of either Rayleigh, Lamb, Love or Stonely modes along a surface or interface of the substrate upon selective electromagnetic wave excitation of the RF transponder tag antenna by a pulsing RF transceiver broadcasting an RF field in the EASI control zone; an encoded reflection groove or grating pattern disposed on a surface of the substrate in the path of propagation of the SAW and having varying spacings and/or depths of the grooves or gratings to produce phase and/or amplitude modifications of SAW reflections and thereby encoding of the train of electromagnetic responses or echoes from the RF transponder tag back to the RF transceiver; and a sandwich cover plate or composite layer enclosing or adhering to the IDT and SAW propagation surface of the substrate. Optional additional or alternative features include unidirectional launching IDT's, inductors or circulators connected to the transponder tag antenna and carried by the tag or integrated onto the SAW Chip substrate and Bragg scattering dot or post arrays in place of the grooves or gratings.

BRIEF DESCRIPTION OF THE DRAWING

In the drawing, in which like numbers are used to denote like or identical parts, components or elements throughout.

PREFERRED MODE FOR CARRYING OUT THE INVENTION

Figure 1:
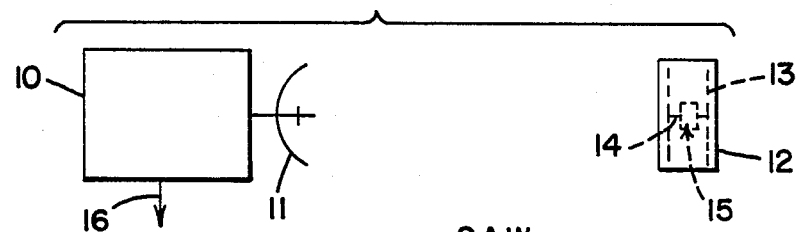
FIG. 1 is a schematic arrangement of an electronic article surveillance ("EAS") and identification ("EASI") system.

Referring to FIG. 1, an EASI system generally comprises a coordinated pulsing transmitter-receiver ("transceiver"), low-power "radar" or interrogator 10 having an antenna 11 to broadcast a radio frequency ("RF") signal to a transponder tag 12 within the transmitting field range of the transceiver interrogator 10. If a SAW transponder tag 12 is present, its wire or foil antenna 13 receives the transmitted pulse signal, impresses it on the SAW microchip 15 via wire bonds or sonically welded contacts 14 and retransmits a coded "echo" or reply signal to the transceiver interrogator 11. The reply is then converted from an analog to digital signal in the interrogator 10 and emerges from a microprocessor therein via an industry standard ribbon computer connector cable 16, plug-compatible with personal computers, programmable controllers and computer network interfaces. The general design and functional specifications of such an interrogator 10 are well known in air traffic control radar and are disclosed and discussed, for example, in the previously-cited Cole-Vaughan and Epstein-Jordan publications.

Figure 2:
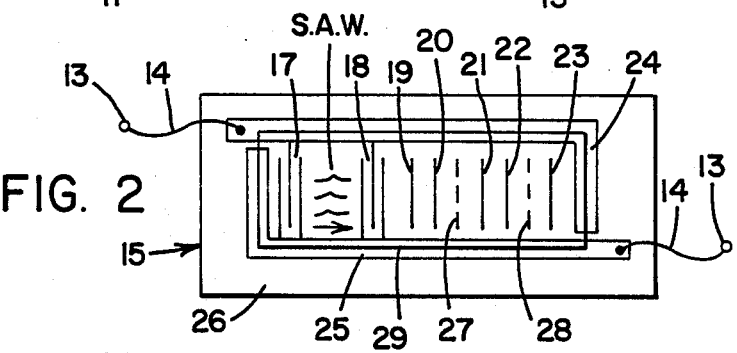
FIG. 2 is a diagrammatic top or plan view, partially schematic, of an encoded SAW Chip, with biphase encoded IDT's, for a passive RF transponder as disclosed, for example, in the Cole-Vaughan prior art.

Referring next to FIG. 2, a prior art amplitude encoded SAW microchip 15 is depicted having biphase (0 and 180 degrees) encoded electrode IDT's 17–23 interleaved between bus electrodes 24 and 25 to thereby form a single-port SAW device on a piezoelectric substrate 26 for connection by wire bonds or ultrasonically welded flip-chip lead frames 14 to the SAW transponder tag antenna 13, which may be dual dipole, as in FIG. 1, or a folded dipole, spiral or other omnidirectional configuration. The IDT's 17–23 are enclosed by a solder glass cover plate, the borders of which are indicated by the numeral 29, in much the fashion of covers for liquid crystal displays. The SAW microchip of FIG. 2 represents versions published by Cole-Vaughan I, as modified by Cole-Vaughan II for temperature sensing wherein the substrate 26 is composed of lithium niobate or a suggested composite of glass and sputtered zinc oxide.

In operation, this Cole-Vaughan SAW transponder microchip 15 receives a pulsed electromagnetic signal on its leads 14 to antenna 13 from the transmitting antenna 11 of interrogator 10. The signal impresses across the bus electrodes 24 and 25 which is converted by piezoelectric action into a surface acoustic wave ("SAW") at the launching "comb" or IDT 17. The SAW then strobes under IDT's 18–23, which are normally spaced one-eighth of a SAW wavelength apart along the bus electrodes 24 and 25. (IDT's 19–23 are indicated schematically by single lines rather than in full three electrode illustrations, but are identical in structure to IDT 18.) The SAW is then reconverted to a voltage, appearing at each IDT and reradiating back through bus electrodes 24 and 25, leads 14 and antenna 13 as "echoes" or a reply to the interrogator 10. The dashed lines 27 and 28 indicate missing or shorted IDT's at normal intervals, laser-trimmed in fabrication, thus producing binary reply code bits ("0" or "1") of "0"; while IDT's 18–23 produce reply codes of "1." Hence, the Cole-Vaughan SAW transponder microchip 15 of FIG. 2 has an eight bit biphase code of "11101101."

Figure 3:
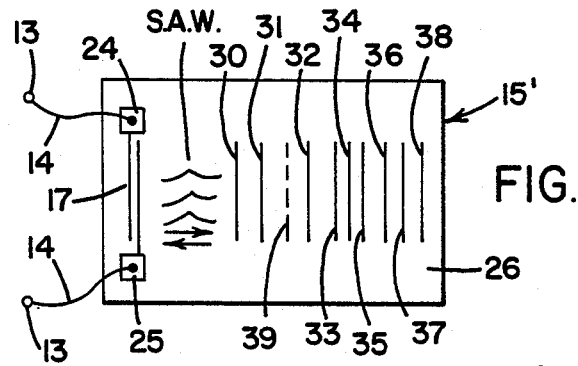
FIG. 3 is a diagrammatic top or plan view, partially schematic, of an encoded SAW Chip embodying the concepts of the present invention utilizing quadriphase encoded reflection grooves or gratings.

Referring now to FIG. 3, a simplified version of an EASI transponder tag SAW Chip 15', according to the present invention, is illustrated schematically. Electrode transducers or IDT's 18–23 are replaced by reflection grooves or gratings 30–38, which may be photolithographically or contact-print etched into, or deposited onto, the substrate 26, although direct writing onto wafers of substrate 26 by programmed scanning electron or ion beams or laser scribing or holographic beams is preferred. The grooves or gratings 30–38 are preferably quadriphase encoded at intervals of one-sixteenth wavelength apart. The dashed line 39 represents an omitted or missing groove or grating at a normal interval. The interstitial grooves or gratings, such as 34, are rendered possible by the decreased area requirements and defect-tolerant performance of grooves or gratings, as opposed to defect-prone electrode IDT's. Hence, the SAW transducer 15' of FIG. 3 has a 17 binary bit code capacity; and the code illustrated, counting missing interstitial gratings at one-sixteenth wavelengths, is "10100010111010101."

The SAW launching of IDT 17 of the SAW Chip 15' in FIG. 3 is represented schematically but would be of the same configuration as in FIG. 2 with electrode busses surrounding the SAW propagation path and reflection grooves or gratings 30–38, thereby providing a SAW waveguide as well as a contaminant seal with the solder glass cover plate 29 likewise used with SAW Chip 15'.

If necessary or desirable to avert signal interference or "smearing," launching IDT 17 of the SAW Chip 15' of FIG. 3 may be of a unidirectional type such as disclosed in U.S. Pat. No. 4,028,648, granted to Hartmann and assigned to Texas Instruments Incorporated, or in U.S. Pat. No. 4,521,711, granted to Okamoto and Minagawa and assigned to Clarion Co., Ltd. Alternatively or additionally, to filter the response signal from the SAW Chip 15' an inductor or circulator may be connected to the antenna 13 and mounted on the transponder tag 12 or integrated onto the SAW substrate 26 as disclosed, for example, in the publications of Gopani, Brown and Shumate of Sawtek, Inc., entitled "Integrated Phasing and Matching Networks in Printed Form for a Three-Phase Unidirectional Transducer," and of Yamanouchi, Gautam and Meguro, entitled "Low-Loss Unidirectional SAW Filters Using Integrated Micro-Inductors," published, respectively, at pages 41–46 and 47–52, 1983 *Ultrasonics Symposium,* IEEE No. 90-5607/83.

Examples of equipment and methods for computer programmed scanning and "writing" of the grooves or gratings 30–38 are disclosed in U.S. Pat. No. 4,498,010, granted to Biechler, Carroll, Graves and Lyons and assigned to The Perkin-Elmer Corporation, and in published articles by Cross, Rissman and Shreve of Hewlett-Packard Laboratories, entitled "Microwave SAW Resonators Fabricated with Direct-Writing, Electron-Beam Lithography," 1980 *Ultrasonics Symposium,* pages 158–63, IEEE No. 90-5607/80, and by Bjorkholm and Eichner of Bell Laboratories, entitled "Monitoring the growth of nonuniform gratings written holographically by Gaussian laser beams," *Journal of Applied Physics,* volume 57, number 7, Apr. 1, 1985, pages 2402-05.

Further, rather than propagating SAW waves of the Rayleigh mode as depicted in FIG.'S 2 and 3, the cover plate 29 may be a laminate or composite of amorphous or isotropic material, such as glass, silicon dioxide or even a suitable polymer, directly interfacing with the piezoelectric substrate for propagation of Stoneley waves along the boundary. Such a Stoneley SAW device, although unencoded, is disclosed, for example, in U.S. Pat. No. 4,484,098, granted to Cullen, Grudowski and Meltz and assigned to United Technologies Corporation.

Figure 4:
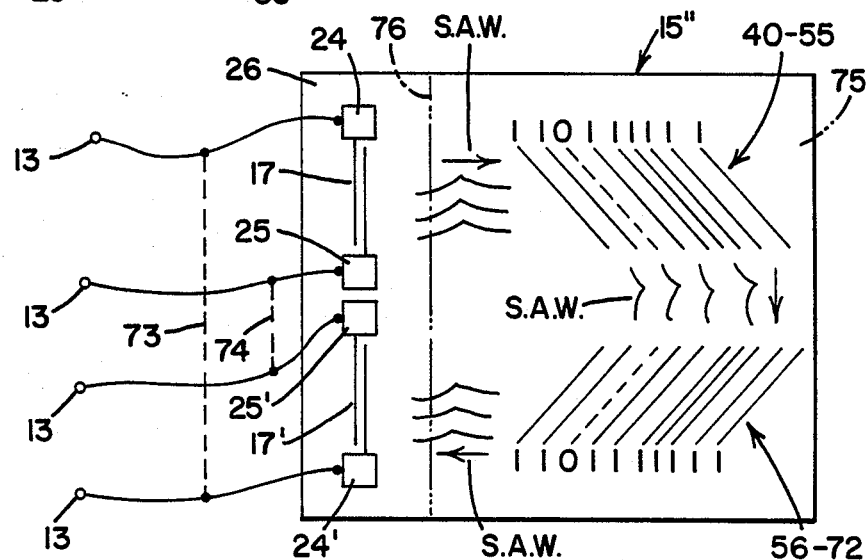
FIG. 4 is a diagrammatic top or plan view, partially schematic, of an improved and preferred form of the SAW Chip of FIG. 3.

FIG. 4 illustrates a preferred and improved version of the invention of FIG. 3, wherein the grooves or gratings 30–38 are "folded" or arranged in oblique chevron or herringbone patterns 40–72, at complementary angles, so as to elimate reflected SAW interference. Counting interstices, the SAW transponder 15" provides 32 binary bit positions 40–72 and is encoded as indicated by binary bit positions indicated near the gratings 40–72. Such a 32 bit capacity provides two raised to the thirty-second power, or 4.3 billion, numerical code combinations. (A Social Security number, for example, has 30 bits.) As shown by the dashed connections 73 and 74, the SAW launching transducer 17 with bus electrodes 24 and 25 and receiving transducer 17' with bus electrodes 24' and 25' may be connected by jumpers (which may be air-gap shunts or wire bonds on the substrate 26) to form a single port for connection to the SAW transponder tag antenna 13, To prevent SAW interference and cancellations, transducers 17 and 17' should be unidirectional or multiphase as previously disclosed.

As illustrated by chain line 76 in FIG. 4, a mechanical junction may be formed between the piezoelectric substrate 26 and a less expensive thin steel, plastic or other nondispersive acoustic shear wave propagating material 75, such as used in prior art "IMCOM" devices disclosed in the above-cited Williamson publication.

Alternatively to gratings or grooves 40–55 and 56–72, encoded rows of Bragg reflection scattering dot or post arrays may be employed as disclosed in U.S. Pat. No. 4,336,514, granted to Paige and assigned to National Research Development Corporation, London, England.

Further, infinite geometric configurations of the grooves or gratings 30–38 and 40–72 may be utilized as disclosed, for active and/or unencoded SAW devices, however, in, for example, U.S. Pat. Nos. 3,931,597, granted to Cho and Hunsinger and assigned to Magnavox Company (staggered or dogleg transducers); 4,268,808, granted to Melngailis and assigned to MIT (wrap-around or dual surface grating pattern); and 4,453,242, granted to Toda and assigned to RCA Corporation (concentric transducers).

Moreover, a variety of piezoelectric materials for the substrate 26 of the SAW Chip 15' may be utilized including inexpensive composites such as disclosed, for example, in the publication of S. J. Martin and others of Purdue University, entitled "Surface acoustic wave resonators on ZnO-on-Si layered medium," *Journal of Applied Physics,* Feb. 1, 1983, volume 54, number 2, page 561. Applicant's research has also revealed feasibility for substrates 26 of piezoelectric polymers such as polyvinylidene fluoride, nylon, celluloid and teflon, yielding inexpensive "plastic" SAW Chips 15' and 15". In this connection, for example, reference may be had to the publication by S. C. Mathur and others of Rutgers University, entitled "Piezoelectric properties and ferroelectric hysteresis effects in uniaxially stretched nylon-11 films," *Journal of Applied Physics,* Nov. 1, 1984, volume 56, number 9, page 2419.

Thus, it should be evident that the SAW Chip for passive EASI transponders disclosed herein carries out the various objects of the invention set forth hereinabove and otherwise constitutes an advantageous contribution to the art. As has been noted in some instances and as will be apparent to persons skilled in the art, modifications can be made to the preferred embodiment disclosed herein without departing from the spirit of the invention, the scope of the invention being limited solely by the scope of the attached claims.

I claim:

1. A passive surface acoustic wave transponder device comprising electrical input and output connections, a substantially ominidirectional antenna generally coupled to said connections, a substrate having a surface of piezoelectric material, an electrode transducer contacting said surface of said substrate and connected to said input to launch said wave upon selective electromagnetic excitation of said antenna by a field broadcast from a transceiver remote from said antenna and device, and a plurality of encoded transducers disposed along the path of said wave for reflection of echoes thereof to said output without electrodes and conversion of said wave to a voltage at said encoded transducers.

2. A passive acoustic wave transponder device according to claim 1, wherein said encoded transducers are a predetermined pattern of reflection grooves along said path.

3. A passive surface acoustic wave transponder device according to claim 1, wherein said encoded transducers are a predetermined pattern of reflection gratings along said path.

4. A passive surface acoustic transponder wave device according to claim 1, wherein said encoded transducers are a predetermined pattern of Bragg scattering element along said path.

5. A passive surface acoustic wave transponder device according to claim 1, wherein said encoded transducers are disposed in a substantially complementary chevron pattern for oblique reflections of said echoes of said wave.

6. A passive surface acoustic wave transponder device according to claim 1, wherein said encoded transducers are disposed in a circular pattern for substantially concentric reflections of said echoes of said wave.

7. A passive surface acoustic wave transponder device according to claim 1, wherein said path extends along more than once surface of said transponder device.

8. A passive surface acoustic wave transponder device according to claim 1, having a cover over said electrode and encoded transducers and path to prevent contamination.

9. A passive surface acoustic wave transponder according to claim 8, wherein said cover is of substantially isotropic material in contact with said transducers and substrate for launching of said wave and reflection of echoes thereof along the interface of said contact in substantially a Stonely mode.

10. A passive surface acoustic wave transponder device according to claim 1, wherein said substrate is a composite of piezoelectric and substantially isotropic material.

11. A passive surface acoustic wave transponder device according to claim 1, wherein said substrate is composed of a polymer providing said surface of piezoelectric material.

* * * * *